United States Patent [19]
Merstallinger et al.

[11] 3,887,283
[45] June 3, 1975

[54] OPTICAL SYSTEM FOR A MICROSCOPE PHOTOMETRY ATTACHMENT

[75] Inventors: Kurt Merstallinger; Klaus P. Schindl, both of Vienna, Austria

[73] Assignee: C. Reichert Optische Werke, AG, Vienna, Austria

[22] Filed: Apr. 1, 1974

[21] Appl. No.: 456,485

[30] Foreign Application Priority Data
Apr. 4, 1973 Austria .............................. 2940/73

[52] U.S. Cl. ................. 356/219; 356/225; 350/34; 350/35
[51] Int. Cl. ........................ G01j 1/42; G02b 23/02
[58] Field of Search ............ 350/34, 33, 35, 48, 49, 350/50, 285; 356/233, 225, 153, 219

[56] References Cited
UNITED STATES PATENTS
1,958,280   5/1934   Patterson et al. ..................... 350/34
FOREIGN PATENTS OR APPLICATIONS
218,272   11/1961   Austria ............................... 350/49

Primary Examiner—Ronald L. Wibert
Assistant Examiner—Jon W. Henry
Attorney, Agent, or Firm—Alan H. Spencer; William C. Nealon; Howard R. Berkenstock, Jr.

[57] ABSTRACT

An optical relay system for a microscope photometry attachment permitting simultaneous viewing of the object and precise location of the object area being photometrically evaluated.

5 Claims, 8 Drawing Figures

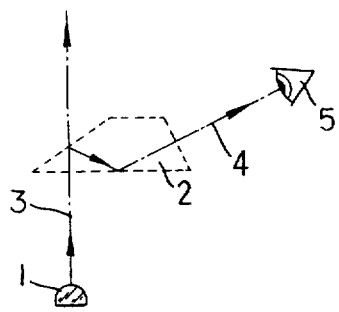
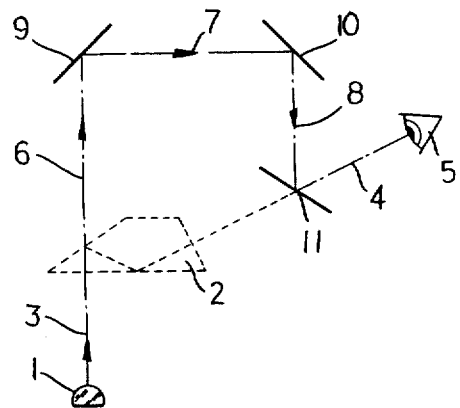
FIG. 1
PRIOR ART
FIG. 2
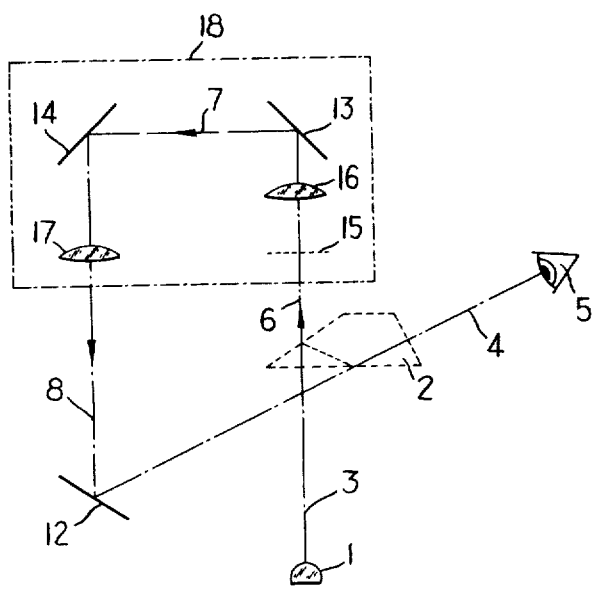
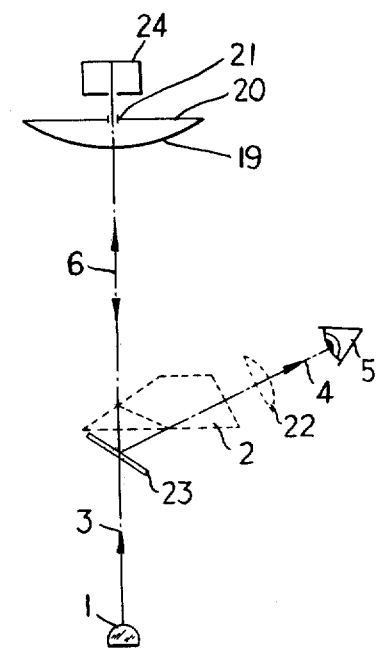
FIG. 3
FIG. 4
MODIFIED PRIOR ART

3,887,283

OPTICAL SYSTEM FOR A MICROSCOPE PHOTOMETRY ATTACHMENT

BACKGROUND OF THE INVENTION

This invention relates to microscope attachments and more particularly, to an optical system for photometric attachments.

Equipment for photometry usually comprises a microscope and an attachment containing the photometric equipment and a special monocular eyepiece. The user was hence forced to constantly alternate from the standard binocular having inclined eyepieces to the monocular eyepiece of the photometry equipment. This is inconvenient and the monocular eyepiece was also less practical due to well-known limitations.

In those cases where photometry equipment is used with a binocular body, the advantages of precision adjustment and the accuracy of positioning the area to be evaluated in the aforementioned equipment no longer exist. These attachments therefore cannot render complete satisfaction.

In conjunction with photometric equipment the way is known in itself how to conduct the light for the production of an intermediate image over ray-deflecting elements, for instance mirrors or deflecting prisms, and finally to again image into the original optical axis. It is further known in itself, how to provide optical elements in microscopes which can be shifted out from the ray path such as ray-deflecting elements (prisms, etc.), and to also house the latter with a further optical element on a slide, so that alternately, one element or the other can be brought into the ray path. Such a microscope can also be utilized by itself alone, hence without auxiliary attachment, and in so doing it permits observation by means of binocular inclined eyepieces.

THE INVENTION

The aim of the present invention is to avoid the aforesaid disadvantages and to combine the advantages of the prior art in a new combination.

The invention accordingly pertains to an optical arrangement for microscopes having binocular inclined eyepieces and a photometric attachment. The attachment interrupts the optical path between the objective of the microscope and the binocular eyepieces and comprises at least one ray-reflecting element arranged to be shifted out of the optical path or interchangeable with another optical element, and the observation ray path is thus alternately conducted in conjunction with the shifted first ray-deflecting element through the photometric attachment and additional ray-reflecting elements, until it finally coincides with the original ray path to the binocular eyepieces.

One advantage of the present invention is the observer can undertake photometric measurements without taking his eyes from the binocular inclined eyepieces and nevertheless has the possibility of determining the precise location of the aperture at the same time on the image of the observed specimen.

However, the arrangement in accordance with the invention offers a further advantage at the same time by scarcely raising the cost of the base microscope because only minor changes are required to receive the attachment for the photometry.

Naturally, different types of ray paths can be utilized according to the invention.

For better understanding of the invention, the latter is clarified in greater detail by reference to the drawings, which show schematically some possibilities of arrangement according to the invention.

FIG. 1 represents a ray path of known type for a microscope having inclined eyepieces and shiftable ray-deflecting element;

FIG. 2 shows an arrangement according to the invention for the substitution of the shiftable ray-deflecting element;

Figure 5:
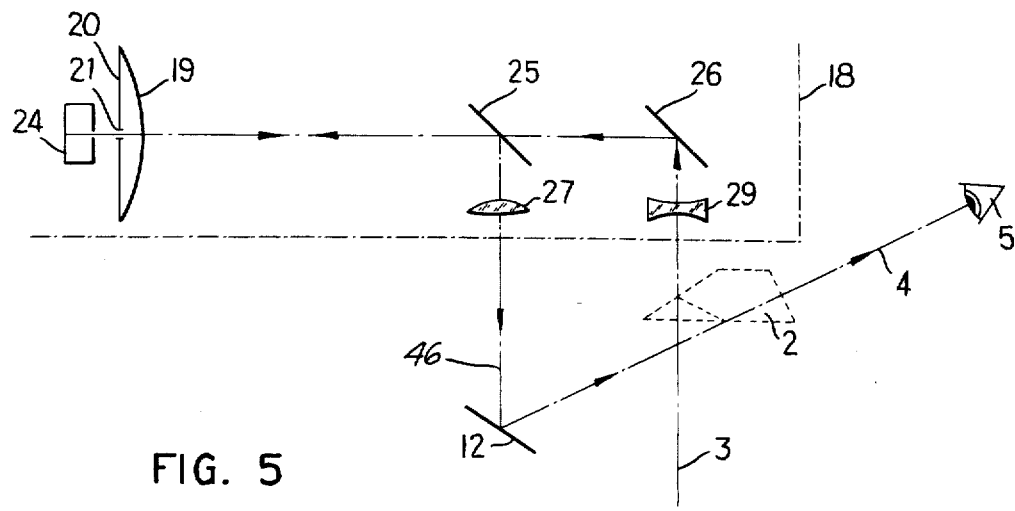
Figure 6:
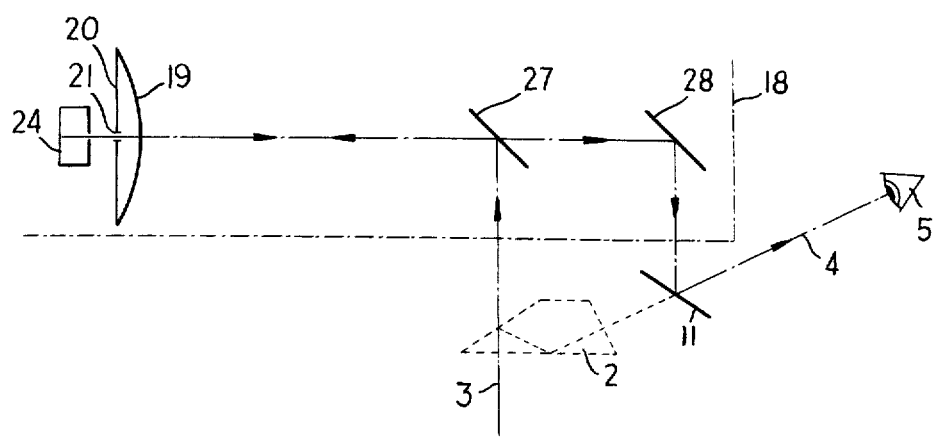
Figure 8:
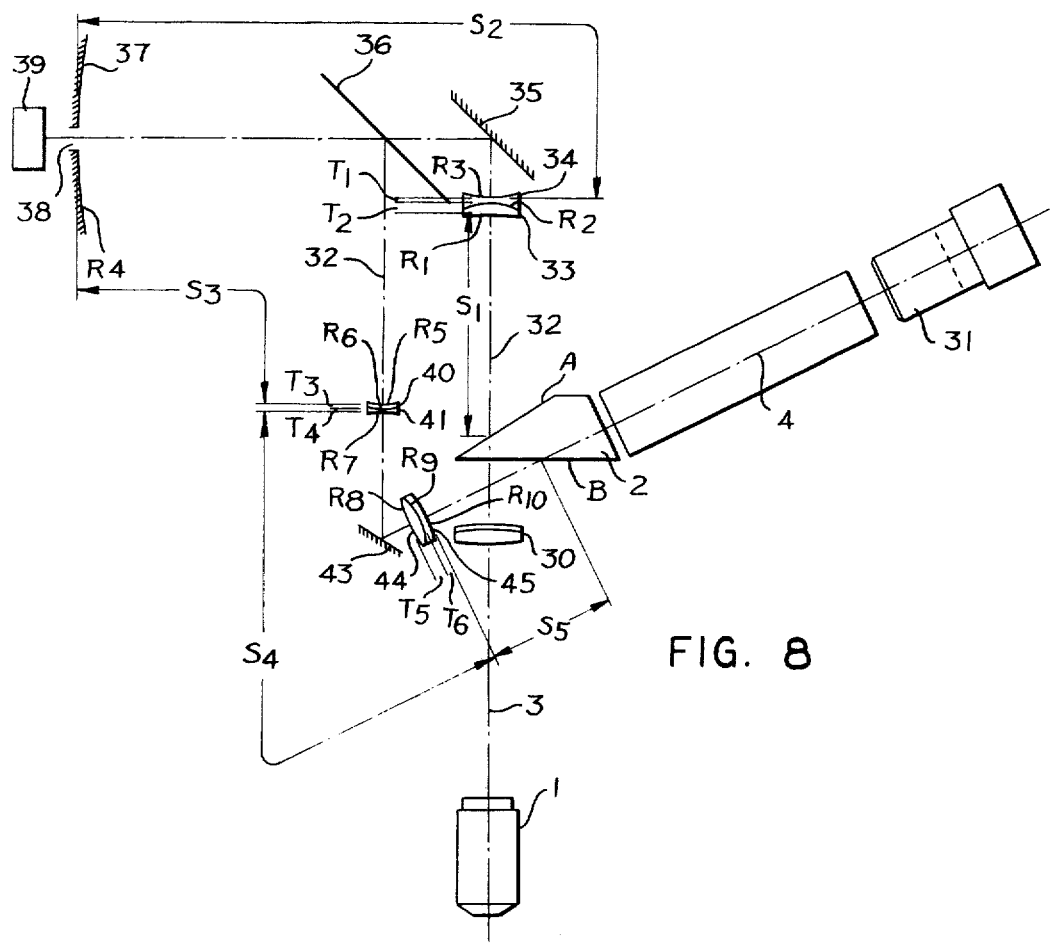
Figure 7:
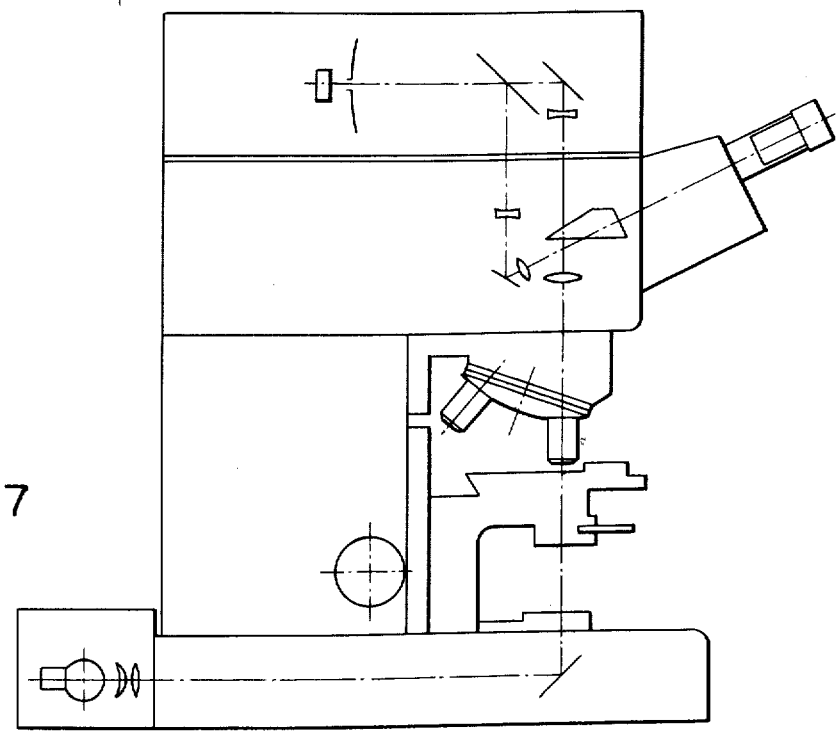

FIG. 3, a further arrangement of the same kind, having modified ray-travel;

FIG. 4 shows very schematically, a possible implementation in connection with a microphotometry attachment, which exhibits a lens silvered on its rear side with a measuring aperture in it;

FIG. 5, a further application of the same sort in which the ray path to the lens is horizontal;

FIG. 6, a modification of FIG. 5;

FIG. 7 is a schematic representation of a conventional microscope with the preferred embodiment of FIG. 5; and FIG. 8 is a detailed schematic showing the preferred embodiment of the present invention with further details on the optics thereof.

In FIG. 1, demonstrating the prior art, 1 designates the objective of a microscope, 2 a ray-deflecting element located therein which can be shifted out of the ray path 3 coming from the specimen. Ray path 3 can continue directly upwards, or by positioning the reflecting element in ray path 3 at least partially deflected along the ray path 4 to the binocular eyepieces 5.

In FIG. 2, an arrangement according to the present invention is exemplified which makes it possible to utilize binocular eyepieces, even if the ray-reflecting element shown by a broken line is removed from the optical path 3. For this purpose, and in accordance with the invention, the ray path 3, which then continues upwards along alternate path 6 is conducted over a deflecting mirror 9 in direction 7 and over a further deflecting mirror 10 in direction 8 from which, by means of the deflecting mirror 11 is again introduced in the original direction 4 to the binocular eyepieces 5.

Both elements 2 and 11 can be operated by a conventional means well known in the art to move the deflecting element 2 out of the ray path, e.g., on a slide or the like, so that only one or the other lies in the ray path.

To conserve space, it is generally more favorable to decide on the arrangement as presented in FIG. 3. There, 18 designates an attachment having a housing generally indicated by dot-dash, inside of which both of the deflecting mirrors 13 and 14 or the like are located, and which also contains image-forming optics 16 and 17. An intermediate image plane is indicated by 15. The deflecting mirror 12 is housed in the microscope base and deflects the ray 8 into the original direction 4, so that it eventually reaches the binocular eyepieces 5 when the deflecting element 2 is disengaged. The arrows indicate the ray path directions away from the objective.

Such an arrangement, consisting of basic microscope and additional equipment 18, has the advantage that the basic microscope, in comparison to prior art implementations has to be changed only slightly and can be used either by itself with all the advantages of the inclined binocular eyepieces or with the attachment.

The invention can be used to special advantage in microscopes and an optical system with a photometric attachment. Such an attachment is described in Austrian Pat. No. 218,272. The known microphotometric attachment has a lens having a silvered rear side, or spherical mirror which has a small aperture for an area to be evaluated which is incident on an analyzer located behind it. An intermediate image of the object is focused on the mirror and a portion of the image passes through the aperture of the mirror to the detector. Thus, in the single monocular, the image of the specimen and the image of the measuring aperture can be seen. This allows a very high degree of precision in photometrically measuring given areas of the specimen. Through the invention, this equipment is further improved, inasmuch as observation is now made possible without two distinct viewing modes and specifically, through the binocular inclined eyepieces usually available on the base microscope.

A modified arrangement of the prior art is shown in FIG. 4. A partially transmissive mirror 23 is insertable instead of the prism 2 and lens 19 in back which is provided a mirror 20, aperture 21 in the mirror 20 and analyzer 24. With this arrangement, however, image-forming optics are necessary which would have to be located between the lens 19 and mirror 23 which would have to be optically suitable for both directions along the ray path 6. Moreover, optical element 22 would have to be added in the ray path 4.

In order to avoid these difficulties, the arrangement of FIGS. 5 or 6 are advantageous. The observation ray path 3 is conducted over an image-forming optics 29 to the deflecting mirror 26 and from there through the semi-transmissive mirror 25 to the lens 19, whose silvered rear side 20 reflects the light, so that it is reflected to mirror 25 through image-forming optics 27 deflected by mirror 12 and from there joins the original observation path 4 to the binocular eyepieces 5. The moveable ray-deflecting element (prism) 2 is drawn in with a broken line to show that it may be shifted out of ray path 3. Deflecting mirror 12 can be permanently mounted in the microscope and deflects the alternate observation ray path 46 to join observation ray path 4. The dot-dash line 18 again indicates the border or outline of the attachment equipment, which can be placed on the basic microscope. The ray-path of FIG. 3 is similar to that of FIG. 5, and the ray-path according to FIG. 2 is similar to that of FIG. 6.

In FIG. 6, the ray coming from the objective 1 is led over the semi-transmissive mirror 27 to the lens 19 and rear silvered mirror surface 20 whence it is reflected, penetrates semi-transmissive mirror 27 and is deflected by mirrors 28 and 11 from which it passes along original ray path 4 to the binocular eyepieces. This embodiment will be unlikely to practice, because it requires too much space in the binocular body.

The schematic representation of FIG. 7 will be discussed with respect to the preferred specific optics detailed in FIG. 8. Light from the object and objective 1 passes along ray path 3 through optional telescope objective 30 to prism 2, wherein it is deflected at surfaces A and B along observation path 4 to binocular eyepieces 31. When prism 2 is shifted out of the observation axis along ray path 3, an alternate observation axis 32 is followed. Image forming optics comprising lens elements 33 and 34 focus an object image, after deflection by mirror 35 and passing through partially transmissive mirror 36 on spherical mirror 37. Spherical mirror 37 has an aperture 38 axially positioned and a photometric detector 39 is positioned behind the aperture 38 to evaluate the portion of the object image passing therethrough. The remainder of the object image is reflected by mirror 37 and deflected by the partially transmissive mirror 36 to lens elements 40 and 41. The light continues along the alternate observation axis 32 and is deflected by mirror 43 through lens elements 44 and 45 to join the original observation axis 4 at a plane equivalent to surface B of prism 2, when the prism is positioned in the observation path 3.

The following table presents the optical parameters of the elements shown in FIG. 8 with the lens radii in millimeters, R1 to R10 having a minus (−) sign to indicate a radius on the axis on the object side of the lens or mirror, T1 to T6 being the thickness of the lens in millimeters, S1 to S5 being the distance in millimeters between optical elements, exclusive of 0-power mirrors, and ND1 to ND6 being the index of refraction of the glass used in the lens elements.

TABLE

| Lens | Radius | Thickness | Space | Index of Refraction |
|---|---|---|---|---|
|  |  |  | S1= 58.53 |  |
| 33 | R1 =− 69.122 | T1= 5.00 |  | ND1=1.78472 |
|  | R2 =− 36.446 |  |  |  |
| 34 |  | T2= 3.00 |  | ND2=1.50378 |
|  | R3 = 43.536 |  |  |  |
|  |  |  | S2=195.55 |  |
| 37 | R4 =−251.990 |  |  |  |
|  |  |  | S3=235.46 |  |
|  | R5 =− 43.536 |  |  |  |
| 40 |  | T3= 2.00 |  | ND3=1.69895 |
|  | R6 =− 25.000 |  |  |  |
| 41 |  | T4= 1.00 |  | ND4=1.51680 |
|  | R7 = 237.920 |  |  |  |
|  |  |  | S4= 67.00 |  |
|  | R8 = 237.920 |  |  |  |
| 44 |  | T5= 4.00 |  | ND5=1.51680 |
|  | R9 =− 23.386 |  |  |  |
| 45 |  | T6= 2.00 |  | ND6=1.69895 |
|  | R10=− 39.257 |  |  |  |
|  |  |  | S5= 53.09 |  |

Naturally, not all of the possibilities of execution and possibilities of application of the invention are described through the exemplifications presented in the figures. Instead of the deflections coursing rectangularly, other angles can be used; also, more than the indicated number of deflections can be provided in order to adapt to given constructions. Finally, the ray conduction could naturally be deviant from the horizontal or the vertical. Instead of a basic microscope and an auxiliary attachment, the overall arrangement could also be constructed as a single unit. Also, instead of the lens 19 which is silvered on the back, a concave mirror (not shown in FIGS. 4–6) can be provided. Further, applications in the area of the polarization methods are conceivable, where it is necessary to further provide an intermediate image formation of the object or of the objective pupil with an analyzer located therein to avoid disturbing polarization by an optical element.

What is claimed is:

1. In a microscope having an objective, an inclined binocular eyepiece, and a beam deflector associated therewith aligned along an observation axis for viewing an object, the improvement comprising means to move said beam deflector out of the observation axis to provide an alternate observation axis, a positive reflective element aligned on said alternate observation axis, optical means to image said object on said positive reflecting element, said positive reflective element having an aperture axially located therein, means for performing photometric analysis located behind said aperture and permitting photometric evaluation of the corresponding portion of the object imaged on the positive reflecting element, and reflecting means to deflect the object image reflected by the positive reflective element along said alternate observation axis to said eyepiece to provide the observer simultaneous viewing of said object and said aperture.

2. The improvement of claim 1 wherein said positive reflective element is a spherical mirror.

3. The improvement of claim 2 further including a reflecting element on said alternate observation axis thereby deflecting the alternate observation axis toward the spherical mirror, and a partially transmitting reflective element on said alternate observation axis, between said reflective element and said spherical mirror to deflect the optical path of the object image reflected by said spherical mirror toward said eyepiece.

4. The improvement of claim 3 wherein said optical means is a double concave doublet and further including an optical system to image said object and aperture in said eyepiece.

5. The improvement of claim 4 wherein the optical means, the spherical mirror, and the optical system have the following values, wherein the linear dimensions are in millimeters:

| Lens | Radius | Thickness | Space | Refraction Index of |
|------|--------|-----------|-------|------------|
|      |        |           | S1= 58.53 |  |
|      | R1 = −69.122 |     |       |  |
| 33   |        | T1= 5.00  |       | ND1=1.78472 |
|      | R2 = −36.446 |    |       |  |
| 34   |        | T2= 3.00  |       | ND2=1.503781 |
|      | R3 = 43.536 |     |       |  |
|      |        |           | S2=195.55 |  |
| 37   | R4 = −251.990 |   |       |  |
|      |        |           | S3=235.46 |  |
|      | R5 = −43.536 |    |       |  |
| 40   |        | T3= 2.00  |       | ND3=1.698951 |
|      | R6 = −25.000 |    |       |  |
| 41   |        | T4= 1.00  |       | ND4=1.51680 |
|      | R7 = 237.920 |    |       |  |
|      |        |           | S4= 67.00 |  |
|      | R8 = 237.920 |    |       |  |
| 44   |        | T5= 4.00  |       | ND5=1.51680 |
|      | R9 = −23.386 |    |       |  |
| 45   |        | T6= 2.00  |       | ND6=1.698951 |
|      | R10=−39.257 |     |       |  |
|      |        |           | S5= 53.09 |  | wherein S1 is the distance along said alternate observational axis to the optical means and S5 is the distance along said alternate observational axis from said optical system to coincidence with the observational axis, S2, S3 and S4 are distances between optical elements exclusive of 0-power reflective elements, negative values indicating a radius of curvature on the object side of a lens and the referenced radii, thickness and spaces are those indentified in FIG. 8.

* * * * *